United States Patent Office 2,700,041
Patented Jan. 18, 1955

2,700,041

6-BENZYLOXY-7-METHOXY-1-METHYL-3,4-DIHYDROISOQUINOLINE AND ITS PROCESS OF PREPARATION

Arthur W. Weston, Marjorie B. Moore, and Richard K. Richards, Waukegan, and Edward J. Matson, Libertyville, Ill., assignors to Abbott Laboratories, North Chicago, Ill., a corporation of Illinois No Drawing. Application August 21, 1951,
Serial No. 242,986

11 Claims. (Cl. 260—286)

The present invention relates to physiologically active derivatives of hydroisoferulic acid and the improved processes of preparing them. More specifically, the present invention relates to a substituted 3,4-dihydroisoquinoline and acid addition salts thereof.

We have discovered that 6-benzyloxy-7-methoxy-1-methyl-3,4-dihydroisoquinoline and certain of its soluble salts have very desirable and unexpected physiological characteristics. For example, valuable local anesthetic properties are exhibited by said compound and to a varying degree by the hydrochloride, sulfate, nitrate, borate, d-tartrate, and oxalate salts thereof.

The following examples illustrate processes for preparing the salts of 6-benzyloxy-7-methoxy-1-methyl-3,4-dihydroisoquinoline.

EXAMPLE I

Method A

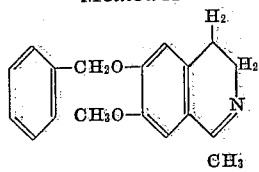

6-benzyloxy-7-methoxy-1-methyl-3,4-dihydroisoquinoline
(VI)

The reactions of the processes involved in making 6-benzyloxy - 7 - methoxy - 1 - methyl - 3,4 - dihydroisoquinoline may best be shown by structural formula equations. The process in general equations is:

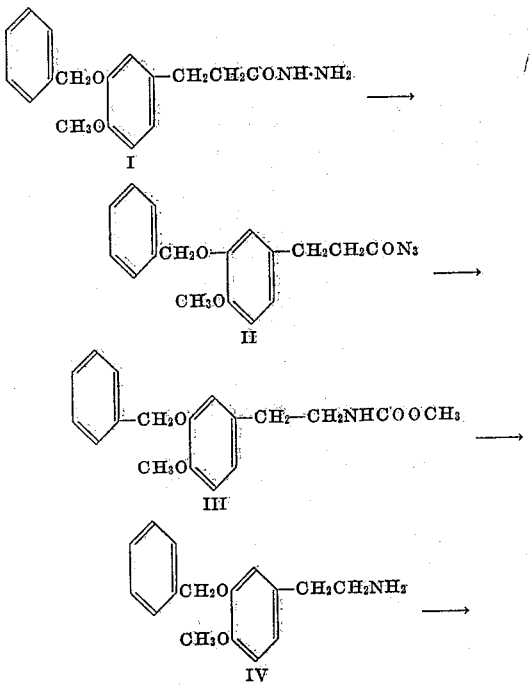

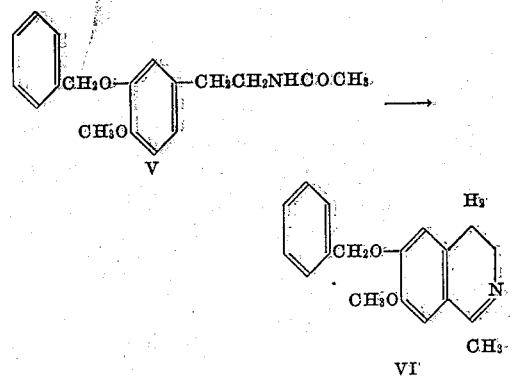

In specific detail the reactions are given in the following descriptions:

About 39 parts of O-benzylhydroisoferulhydrazide (I), Schopf et al., Ann., 497, 47, (1932), are dissolved in about 300 parts of glacial acetic acid. About 15 parts of hydrochloric acid are added to the resultant solution, and a solution of about 9 parts of sodium nitrite (which forms nitrous acid in the presence of hydrochloric acid) in about 70 parts of water is then added dropwise, keeping the temperature of the reaction mass at about 5–10° C. On completing the addition of the sodium nitrite solution, the solution is poured into excess ice-water and the white precipitate which is formed is filtered and washed with ice-water, then dried. The resulting product is O-benzylhydroisoferulazide (II).

About 8 parts of O-benzylhydroisoferulazide are dissolved in about 750 parts of methanol and refluxed for about 12 hours under calcium chloride protection. The solvent is removed by vacuum distillation and excess hot water is added to the residue. On cooling white needles precipitate from the solution which are filtered and dried. The dried precipitate is methyl-N-β-(3-benzyloxy-4-methoxyphenyl)-ethyl carbamate (III) and has a melting point of 102°–103° C.

About 10 parts of this carbamate (III) are added to a hot solution of about 117 parts of potassium hydroxide and about 400 parts of methanol and refluxed for about 24 hours in an oxygen-free nitrogen atmosphere. The solvent is removed by vacuum distillation and the residue is added to cold boiled water. The yellow oil which separates in the aqueous mixture is separated, extracted with ether and dried. The ether solution contains β-(3-benzyloxy - 4 - methoxyphenyl) - ethylamine (IV). About 3.5 parts of acetic anhydride are added to the ether solution and the resulting mixture is concentrated to form a white precipitate which is filtered and dried. The dried precipitate is N - (β - 3-benzyloxy-4-methoxyphenylethyl-acetamide (V) and has a melting point of 122°–123° C.

The acetamide (V) may be obtained directly from the azide (II) by reacting the azide with acetic anhydride in a benzene solution, e. g. by refluxing the mixture for about four hours.

About 9 parts of N-(β-3-benzyloxy-4-methoxyphenylethyl)-acetamide are added to a mixture of about 9 parts of phosphorus pentachloride in 70 parts of dry chloroform. The resulting mixture is maintained at temperatures of about 40–50° C., with stirring, for about an hour. After standing the chloroform is removed by distillation and the residue dissolved in a weak hydrochloric acid solution. The solution is made strongly basic with aqueous potassium hydroxide, and extracted with ether. This ethereal solution contains the free base 6-benzyloxy-7-methoxy - 1 - methyl - 3,4 - dihydroisoquinoline (VI). The reaction is preferably carried out in the range of 40–50° C. to obtain a maximum yield. The salts may be prepared by adding a solution of an acid and a solvent to the ether solution of the free base to form the desired salt. For example, the inorganic salts such as the hydrochloride, sulfate, nitrate and borate and the organic salts, such as the d-tartrate and oxalate are prepared by adding to the ethereal base solution a solution of hydrochloric, sulfuric, nitric, boric, tartaric and oxalic acids, respectively.

EXAMPLES OF SALTS

The hydrochloride is made by titrating the ethereal 6 - benzyloxy - 7 - methoxy - 1 - methyl - 3,4 - dihydroisoquinoline base solution with an ethereal solution of hydrogen chloride until the supernatant is slightly acid to moistened litmus paper. Crystallization is started by scratching and stirring. The stirring is continued until the crystallization is complete, and the crystals are then filtered, washed with dry ether, and dried in vacuo. The 6 - benzyloxy - 7 - methoxy - 1 -methyl - 3,4 - dihydroisoquinoline hydrochloride has a melting point of 205–206° C. with slight decomposition.

To an ethereal solution of 6-benzyloxy-7-methoxy-1-methyl-3,4-dihydroisoquinoline is added about one equivalent of concentrated nitric acid with stirring. The resulting crystals are filtered, washed with ether, and dried in vacuo. The 6-benzyloxy-7-methoxy-1-methyl-3,4-dihydroisoquinoline nitrate which is formed has a melting point of 195–196° C. with decomposition.

An ethereal solution of sulfuric acid is added to the ethereal 6 - benzyloxy - 7 - methoxy - 1 - methyl - 3,4-dihydroisoquinoline, until the supernatant is slightly acid to moistened litmus paper, with stirring. The crystals which are formed are filtered, washed with ether, and dried in vacuo. The resulting 6-benzyloxy-7-methoxy-1-methyl-3,4-dihydroisoquinoline acid sulfate has a melting point of 185–189° C.

The boric acid addition salt is prepared by neutralizing an ethereal solution of 6-benzyloxy-7-methoxy-1-methyl-3,4-dihydroisoquinoline with an acetone solution of boric acid.

Similarly, the above mentioned organic salts are prepared by adding an ethereal solution of the corresponding acid to the ethereal 6-benzyloxy-7-methoxy-1-methyl-3,4-dihydroisoquinoline until the mixture is slightly acid to moistened litmus paper, with stirring. The precipitates thus formed represent the salts 6-benzyloxy-7-methoxy-1-methyl-3,4-dihydroisoquinoline tartrate, melting point 179–180° C. and 6-benzyloxy-7-methoxy-1-methyl-3,4-dihydroisoquinoline oxalate, melting point 194–195° C. The oxalate salt undergoes some preliminary darkening before reaching the melting point.

The dehydrating agent used to close the ring, i. e., from N-(β - 3 - benzyloxy - 4 - methoxyphenylethyl) - acetamide to 6-benzyloxy-7-methoxy-1-methyl-3,4-dihydroisoquinoline in our preferred procedure is phosphorus pentachloride; however, phosphorus pentoxide, phosphorus oxychloride and like compounds may be used.

Aqueous solutions of said salts of 6-benzyloxy-7-methoxy-1-methyl-3,4-dihydroisoquinoline of about 0.6% by weight of the salt have been found to be effective as local anesthetics when administered as drops in animal's and human's eyes. Such animals as rabbits and dogs respond very quickly to the anesthetic action which is then maintained for varying periods up to one hour. We have also discovered that the free base 6-benzyloxy-7-methoxy-1-methyl-3,4-dihydroisoquinoline has similar valuable therapeutic properties and may be used effectively as a local anesthetic when administered in ointment form.

Method B

The N - (β - 3-benzyloxy-4-methoxyphenylethyl)-acetamide (V) which is converted to the isoquinoline derivative by the ring closure, may be prepared by adding about 12 parts of O-benzylhydroisoferulamide (J. Chem. Soc. (1931), page 3169) to about 3.4 parts of sodium hypochlorite in about 50 parts of water, and the resulting mixture stirred for about 1 hour at 70° C. The reaction mixture is cooled and extracted with ether, and the ether extract is washed with dilute hydrochloric acid solution. The water phase is made alkaline with sodium hydroxide and is extracted with ether. The alkaline ethereal extract is distilled to remove the ether, leaving β-(3-benzyloxy-4-methoxyphenyl)-ethylamine (IV) as an oily residue.

The β-(3-benzyloxy-4-methoxyphenyl)-ethylamine is converted to N-(β-3-benzyloxy-4-methoxyphenylethyl)-acetamide (V) by acetylation with acetic anhydride in accordance with the usual methods.

Method C 6-benzyloxy-7-methoxy-1-methyl-3,4 - dihydroisoquinoline (VI) may also be prepared by the following method.

The general reactions may be illustrated by the following structural formulae:

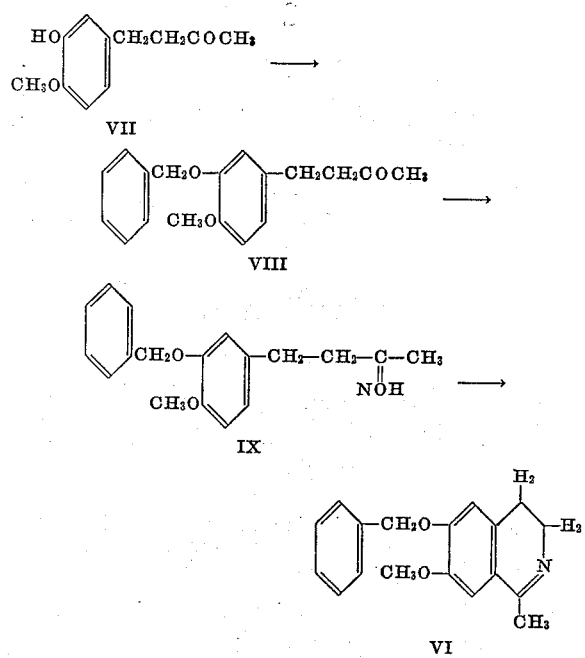

About 9 parts of isovanillylacetone (VII) [Mannich et al., Arch. Pharm. 265, 15 (1927)], about 6.5 parts of potassium carbonate, and about 12 parts of benzylchloride are admixed with about 40 parts of methanol, and the resulting mixture is refluxed for about 6.5 hours. The excess methanol is then removed under vacuum. The residue is added to water, and the oil layer formed is separated from the water layer. The water phase is washed with ether, and the ether wash is added to the oil phase. The combined ether and oil phases are washed with a dilute sodium hydroxide solution and dried over sodium sulfate. The excess ether is removed by distillation and on cooling 3-benzyloxy-4-methoxy-benzylacetone (VIII) crystallizes, and is recovered by filtration. The 3-benzyloxy-4-methoxybenzylacetone melts at 65–66° C.

About 14 parts of 3-benzyloxy-4-methoxybenzylacetone are dissolved in about 150 parts of absolute ethanol. To the resulting solution is added a solution of about 17 parts of sodium acetate and about 8 parts of hydroxylamine hydrochloride in about 60 parts of water, and the resultant mixture is refluxed for about 4 hours. On cooling the reaction mixture, 3-benzyloxy-4-methoxybenzylacetone oxime (IX) crystallizes and is recovered by filtration; the oxime melts at 105–106° C.

About 2 parts of 3-benzyloxy-4-methoxybenzylacetone oxime are added to a solution of about 4 parts of phosphorus pentachloride and about 70 parts of dry chloroform, or other inert solvent. The mixture is allowed to stand for about 3 days at room temperature, and the product is worked up for the recovery of the basic material. Under these conditions the phosphorus pentachloride acts upon the syn-form of the oxime to produce (by a Backman rearrangement) N-(β-3-benzyloxy-4-methoxyphenylethyl)-acetamide, which is then dehydrated by the phosphorus pentachloride to give 6-benzyloxy-7-methoxy-1-methyl-3,4 - dihydroisoquinoline. The chloroform is removed under vacuum and the residue is purified as per Example I, Method A. The free base is obtained by evaporating the ethereal solution to dryness and recrystallizing from petroleum ether. The 6-benzyloxy-7-methoxy-1-methyl-3,4-dihydroisoquinoline is a light colored crystalline solid having a melting point of about 100° C. In place of the phosphorus pentachloride other rearranging and dehydrating agents such as phosphorus pentoxide, phosphorus oxychloride and the like may be used, and other solvents such as ether toluene or petroleum ether may be used.

In the administration of the compounds of the present invention substantially pure acid addition salts, free from the toxic impurities produced during the manufacture of the bases, are employed. The salts are generally administered in an innocuous and inert diluent or vehicle.

For example, a solution is prepared containing 0.6% of 6-benzyloxy-7-methoxy-1-methyl-3,4-dihydroisoquinoline hydrochloride in pure distilled water, and sufficient sodium chloride is added to make the solution about isotonic with the secretions on the mucous surface for which it is intended. In the case of a solution for the cornea, about one per cent sodium chloride may be used. Such solutions are bacteriostatic, and have been found to kill ordinary air-borne bacteria and mold spores after several hours contact. They exhibit a greenish fluorescence and produce profound and lasting anesthesia when applied topically to the cornea.

This is a continuation-in-part of the applicants' abandoned application of the same title, Serial No. 63,442, filed December 3, 1948.

Others may readily adapt the invention for use under various conditions of service, by employing one or more of the novel features disclosed, or equivalents thereof. As at present advised with respect to the apparent scope of our invention, we desire to claim the following subject matter.

We claim:

1. In the process of producing 6-benzyloxy-7-methoxy-1-methyl-3,4-dihydroisoquinoline, the steps which comprise the addition of sodium nitrite to an acid solution of O-benzylhydroisoferulhydrazide to form O-benzylhydroisoferulazide; refluxing said azide with acetic anhydride to form N-(β-3-benzyloxy-4-methoxyphenylethyl) acetamide and the prolonged, intimate contact of said acetamide with a ring closing dehydrating agent selected from the group consisting of phosphorus pentachloride, phosphorus oxychloride, and phosphorus pentoxide to form said 6-benzyloxy-7-methoxy-1-methyl-3,4-dihydroisoquinoline.

2. The process of producing 6-benzyloxy-7-methoxy-1-methyl-3,4-dihydroisoquinoline which consists of prolonged, intimate contact of N-(β-3-benzyloxy-4-methoxyphenylethyl)-acetamide with phosphorus pentachloride.

3. The process of claim 2 where the reaction is maintained at a temperature of about 40–50° C.

4. A compound selected from the group consisting of 6-benzyloxy-7-methoxy-1-methyl - 3,4 - dihydroisoquinoline and acid addition salts thereof.

5. The compound 6-benzyloxy-7-methoxy-1-methyl-3,4-dihydroisoquinoline acid hydrochloride.

6. The compound 6-benzyloxy-7-methoxy-1-methyl-3,4-dihydroisoquinoline acid sulfate.

7. The compound 6-benzyloxy-7-methoxy-1-methyl-3,4-dihydroisoquinoline acid nitrate.

8. The compound 6-benzyloxy-7-methoxy-1-methyl-3,4-dihydroisoquinoline acid oxalate.

9. The compound 6-benzyloxy-7-methoxy-1-methyl-3,4-dihydroisoquinoline acid tartrate.

10. The compound 6-benzyloxy-7-methoxy-1-methyl-3,4-dihydroisoquinoline acid borate.

11. In the process of producing a 6-benzyloxy-7-methoxy-1 - methyl - 3,4 - dihydroisoquinoline, the steps which comprise the addition of sodium nitrate to an acid solution of O-benzylhydroisoferulhydrazide to form O-benzylhydroisoferulazide; refluxing said azide with acetic anhydrazide to form N-(β-3-benzyloxy-4-methoxyphenylethyl)-acetamide; intimately contacting the said acetamide at a temperature between about 40 and 50° C. with phosphorus pentachloride as a dehydrating agent to form 6 - benzyloxy- 7 -methoxy-1-methyl-3,4-dihydroisoquinoline, acidifying the said 6-benzyloxy-7-methoxy-1-methyl-3,4-dihydroisoquinoline with hydrochloric acid until the solution becomes slightly acidic; and recovering the crystalline hydrochloride salt of 6-benzyloxy-7-methoxy-1-methyl-3,4-dihydroisoquinoline formed.

References Cited in the file of this patent

FOREIGN PATENTS 579,227    Germany _____ June 22, 1933

OTHER REFERENCES

Morton: Laboratory Technique in Organic Chemistry, 1938, pp. 4–5.